United States Patent [19]
Kersten

[11] Patent Number: 5,927,359
[45] Date of Patent: Jul. 27, 1999

[54] SYSTEM AND METHOD FOR RECYCLING SCRAP LUMBER

[76] Inventor: Donald Kersten, 5623 N. 68th Pl., Paradise Valley, Ariz. 85253

[21] Appl. No.: 08/947,618

[22] Filed: Oct. 9, 1997

[51] Int. Cl.$^6$ .................................................... B27F 1/00
[52] U.S. Cl. ........................ 144/347; 144/2.1; 144/91; 144/329; 144/3.1; 144/357; 156/250; 156/266; 156/304.1; 156/304.5
[58] Field of Search .............................. 144/2.1, 3.1, 90, 144/91, 91.2, 329, 346, 347, 380, 344, 348, 356, 357, 382; 156/250, 266, 258, 304.1, 304.5, 304.6, 578

[56] References Cited

U.S. PATENT DOCUMENTS

| | | |
|---|---|---|
| 1,924,240 | 8/1933 | Harwell . |
| 2,300,728 | 11/1942 | Goss . |
| 2,908,600 | 10/1959 | Nicholson . |
| 3,262,723 | 7/1966 | Strickler . |
| 3,802,986 | 4/1974 | Forsythe . |
| 3,927,705 | 12/1975 | Cromeens et al. ...................... 144/31.1 |
| 4,128,119 | 12/1978 | Maier . |
| 4,565,597 | 1/1986 | Schulte . |
| 4,800,938 | 1/1989 | Coombs . |
| 4,938,265 | 7/1990 | Mountz . |
| 5,617,910 | 4/1997 | Hill ........................................... 144/2.1 |

Primary Examiner—W. Donald Bray
Attorney, Agent, or Firm—LaValle D. Ptak

[57] ABSTRACT

A system and method is designed to recover and recycle waste lumber wood scrap products from construction sites and process this waste scrap lumber into lengths of recycled, usable lumber. The system processes "2×4" and to "2×6" lumber scraps from one or more construction sites and processes such material into recycled construction material in the form of finger jointed "2×4" and "2×6" lumber. The method and system accepts and utilizes random lengths of different species with different moisture contents. After the construction waste wood scrap products are delivered to a recovery site, unusable wood scrap products are removed. The usable products are processed by squaring the ends and cutting out defects; and the "2×4" sizes are separated from the "2×6" sizes. Under-width product is removed; and the squared random lengths of remaining product then are continuously supplied to finger joint machines for fabricating desired lengths of finished recycled lumber, which then may be utilized in further construction.

17 Claims, 2 Drawing Sheets

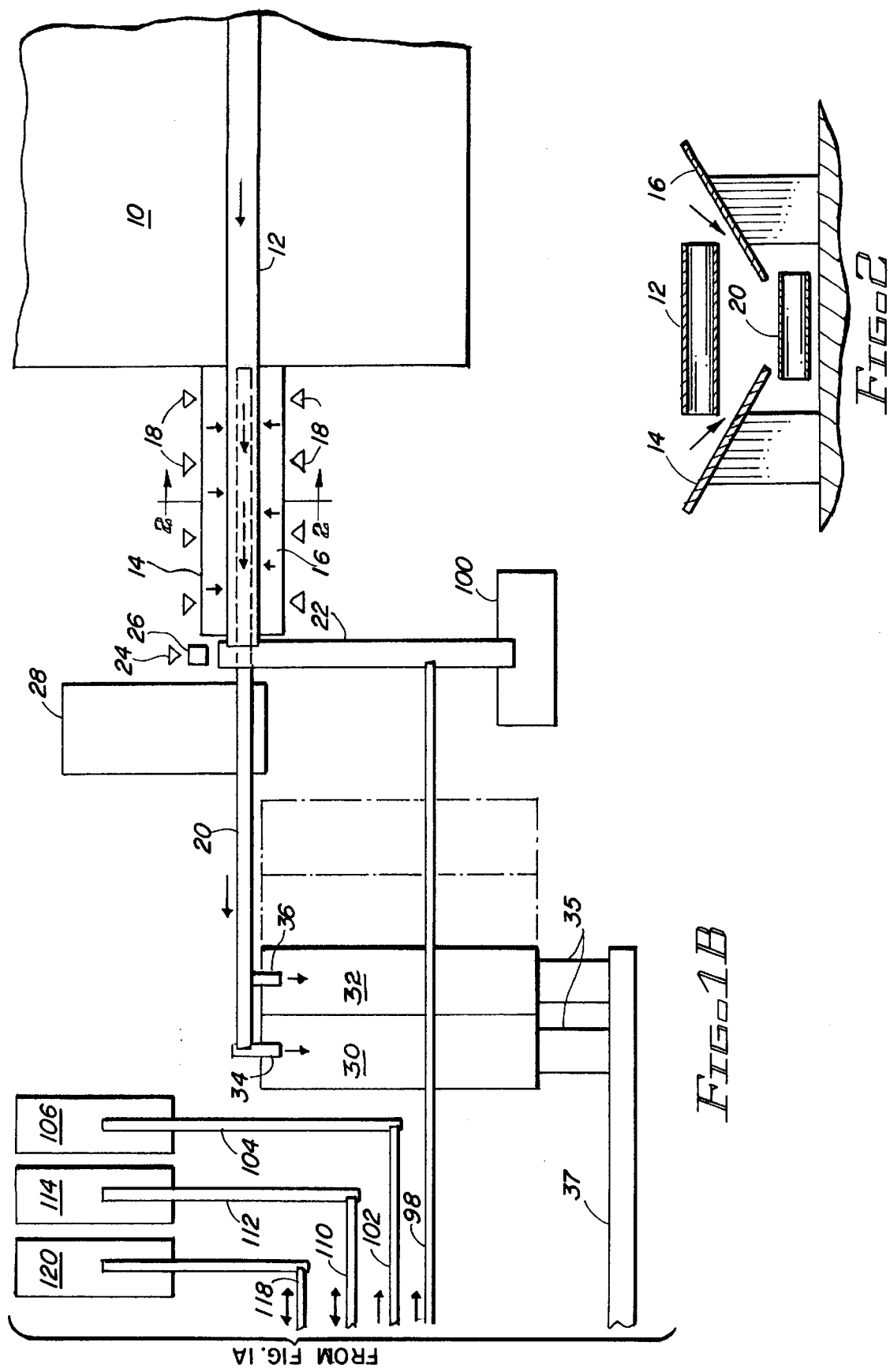

SYSTEM AND METHOD FOR RECYCLING SCRAP LUMBER

BACKGROUND

Wood scraps which are discarded from truss plants and building construction sites, in the form of 2"×4" and 2"×6" pieces of framing lumber of varying lengths, currently are treated as waste material, resulting in a disposal problem. The handling of this waste material, namely its removal and disposition, is factored into construction costs. In large home development projects and truss plants, companies specializing in cleaning building sites generally are responsible for the disposal of the material. Such companies either haul this material into landfills or supply it to low-end users of wood products to get rid of it.

The low-end users of wood products vary throughout the United States, but one thing is in common. The common element is that low-end users do not have the ability to take the wood scrap material and convert it back into anything close to its original market value. As construction wood products become increasingly costly, partially as a result of limited available resources, the failure to recycle 2"×4" and 2"×6" scraps results in the loss of significant amounts of expensive materials.

Current low-end users of scrap wood are companies which produce mulch, pulp fiber, particle board and fuel for thermal energy generating stations. At the present time, the sale value of the reprocessed material into any of these uses does not result in a value of the material which exceeds over forty dollars per ton. This is significantly less than the original cost of the lumber in the form of 2"×4" and 2"×6" boards used in the construction of a home or other building.

The current end markets for wood scrap products and discarded wood material all require some separation by grade of material prior to its processing. In the manufacture of pulp paper, the scrap wood products are separated by grade and then are reduced to fiber as an additive for use in recycling and original paper manufacturing. In the manufacture of particle board, the wood scrap products are separated by grade and then are ground into utile form to produce particle board. For processing into mulch or agricultural products, the wood scrap products again are separated by grade and then are ground into mulch or added to other agricultural products. Finally, when wood scrap products are to be used for thermal energy generating facilities, it again is necessary to separate the wood scrap products by grade and grind the selected products into a form for use in such a thermal energy generating facility in the states which allow and permit the burning of organic material.

All of the foregoing current end uses of construction waste lumber in the form of waste scrap products result in a relatively low payout from the low-end users of these wood products for the raw material which is being converted into these different end uses. As a result, material handlers who remove such wood scrap products from a building site often find it most cost efficient simply to dispose of the material in a landfill, and ignore the secondary end users altogether.

Machines known as "finger joint machines" have been developed for processing random lengths of lumber into finished products, particularly for non-structural molding and trim for door openings, windows, chair rails and the like. When the finished product is to be painted, the fact that the molding or trim is comprised of a variety of different lengths of products which are joined together at glue joints by the finger joint machines is of no consequence. In factories which produce such molding from varying lengths of stock lumber, the lumber input for the finger joint machines is of consistent quality, that is, it typically is obtained from a single source and does not include defects of the type which could occur in construction site scrap lumber, such as broken ends, nails, non-square ends and the like. In addition the lumber employed in a typical finger joint factory is all of the same type and moisture content. Such lumber also is "new" lumber, which also makes its handling by a finger-joint machine relatively simple.

The two United States patents to Goss U.S. Pat. No. 2,300,728 and Forsythe U.S. Pat. No. 3,802,986 both are directed to the utilization of scrap lumber at a saw mill or manufacturing plant where the type of lumber, moisture content and dimensions are consistent. Such lumber does not include any defects, such as embedded nails or the like. The Goss patent discloses the use of a truck which delivers board pieces to a location where an operator visually inspects the pieces. The operator then operates a trim saw or cutoff saw to remove defects from the lumber and to square the ends of the pieces. From the this location, the lumber pieces then move to a machine which forms finger joints in them; and successive pieces are longitudinally formed together to form boards of commercial length. There is nothing in the Goss patent, however, to indicate that construction scrap from one or more sites can be processed together at a manufacturing location. The lumber which is utilized in the Goss system should be of consistent quality and dimensions, since it all is obtained from the sawmill or manufacturing plant itself. There is nothing in this patent which is directed to a construction waste wood or lumber recovery system or method.

The Forsythe patent is directed to a method and apparatus for producing lumber from short pieces at a lumber mill or the like. No utilization of scraps of varying parameters is suggested or disclosed in this patent. Trim saws are disclosed for squaring up the pieces and for removing defects. The system of Forsythe employs pre-heating of the lumber pieces; so that high moisture content boards may be used in the finger joint machine.

Three United States patents to Harwell U.S. Pat. No. 1,924,240; Nicholson U.S. Pat. No. 2,908,600; and Maier U.S. Pat. No. 4,128,119 are directed to machines or methods for joining short pieces of lumber to make longer pieces. Other U.S. patents directed to techniques for making finger joints are the patents to Strickler U.S. Pat. No. 3,262,723; Coombs U.S. Pat. No. 4,800,938; and Mountz U.S. Pat. No. 4,938,265. A U.S. patent to Schulte U.S. Pat. No. 4,565,597 discloses a technique for manufacturing a veneer web.

None of the above identified patents cover a system or method for converting discarded or scrap lumber building products back into something approximating its original sales/market value.

It is desirable to provide a system and method for recycling lumber wood scrap products of random lengths and of different species, with potentially different moisture contents, into framing lumber in an efficient and continuous manner.

SUMMARY OF THE INVENTION

It is an object of this invention to provide an improved wood scrap recycling system and process.

It is another object of this invention to provide an improved lumber recycling system and process for recovering and recycling construction lumber wood scrap products.

It is an additional object of this invention to provide a system and method for continuously processing construction lumber wood scrap products into new finished lumber construction products.

It is a further object of this invention to recover and recycle construction lumber wood scrap products of various lengths from different construction sites, and of different species, to produce new framing lumber.

In accordance with a preferred embodiment of the invention, a method and system for recovering and recycling construction waste lumber wood scrap products includes delivering waste lumber wood scrap products to a central recovery site. Such delivery may take place on an intermittent basis; and the wood scrap products are removed on a substantially continuous basis from the recovery site. Unusable wood scrap products are discarded from the products removed from the recovery site to obtain recovered wood scrap products. The recovered wood scrap products then are squared and defects are cut out; and the products are separated by sizes according to basic widths, such as 2"×4" and 2"×6". The separated sizes of recovered wood scrap products are measured to remove recovered wood scrap products which are below a minimum width to provide a final supply of usable wood scrap products of the different separated sizes. The usable wood scrap products are supplied sequentially, and preferably continuously, to a finger joint machine for fabricating lengths of finished recycled lumber.

BRIEF DESCRIPTION OF THE DRAWINGS

FIG. 1A and 1B, taken together, are a diagrammatic layout of a preferred embodiment of the invention; and FIG. 2 is a cross-sectional view taken along the line 2—2 of FIG. 1.

DETAILED DESCRIPTION

Figure 1A:
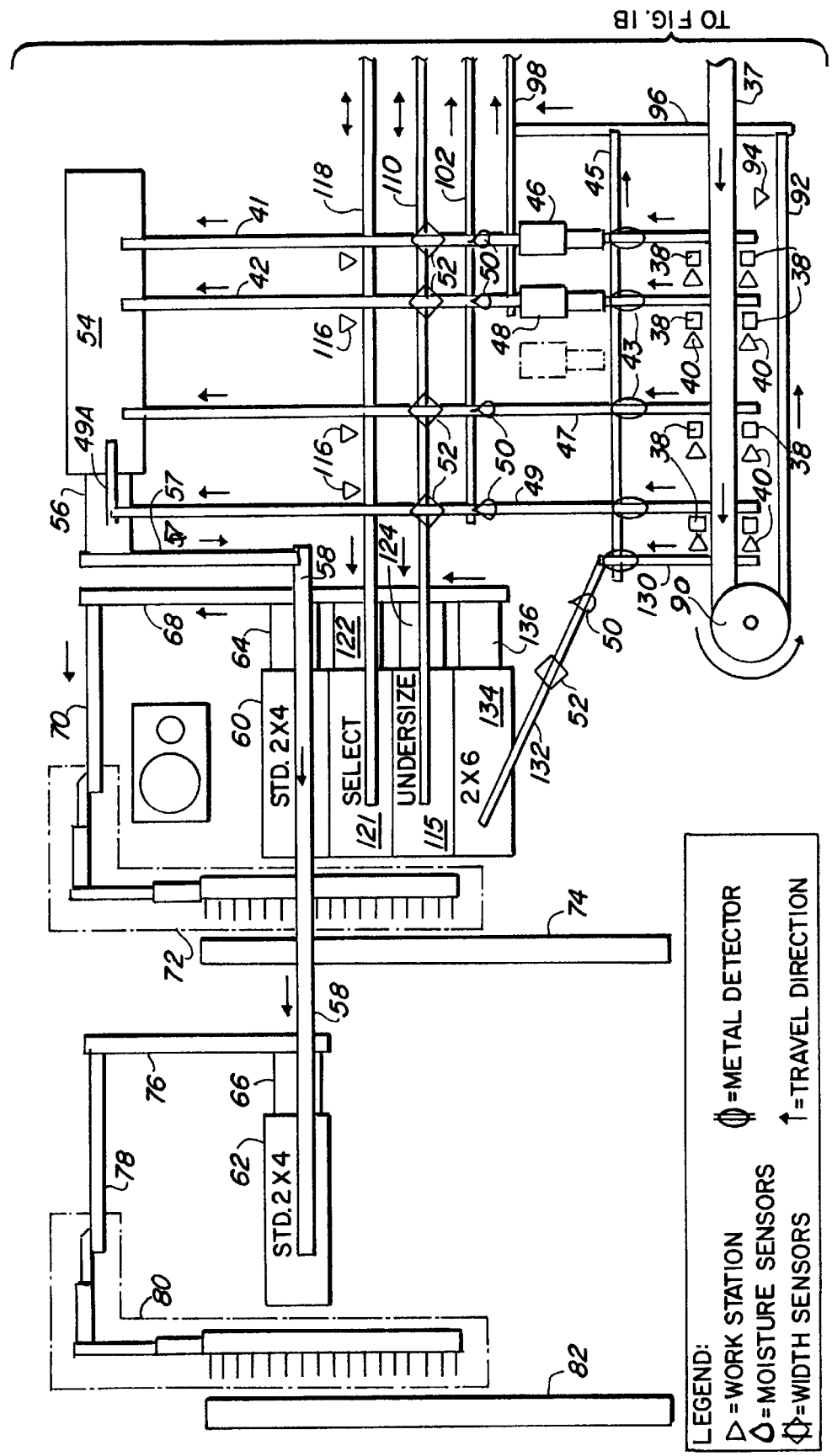

Reference now should be made to the drawing, and more specifically to FIGS. 1A and 1B, which represent a system constructed in accordance with a preferred embodiment of the invention. FIGS. 1A and 1B, interconnected with the right-hand end of FIG. 1A abutting the left-hand end of FIG. 1B, comprise an overall block diagram of a plant layout of a system according to a preferred embodiment of the invention.

At the right-hand side of FIG. 1B is a large storage bin 10 or concrete pad having a size sufficient to permit truck loads of construction scrap material to be dumped and spread out on it. The pad 10 typically slopes upwardly from its outer edges (top and bottom in FIG. 1) from ground level to approximately four feet above ground level at its center. The scrap material includes usable pieces of 2"×4" and 2"×6" framing lumber of varying lengths, along with other types of scrap. The material which is dumped on the pad 10 typically includes the material which is cleaned up from a construction site, and can include broken tile, plywood scraps, insulation pieces, particle board and other materials, as well as the desired 2"×4" and 2"×6" scraps. In any load taken from a home construction site, however, there is a large quantity of trimmings and pieces of the desired 2"×4" and 2"×6" framing material. Skip loaders (not shown) then push the mixed scrap from the pad 10 upwardly onto a conveyor belt 12 located in the raised center of the pad 10 in a manner to maintain a relatively smooth flow of wood scraps and other materials passing at approximately waist height in front of workers 18 located on opposite sides of the conveyor belt 12 at the left-hand end of the pad 10, as shown in FIG. 1B.

The workers 18 remove the desirable or usable 2"×4" and 2"×6" wood pieces or wood scrap products and drop these usable pieces onto a pair of inclined surfaces 14 and 16 located on opposite sides of the conveyor 12. This is shown most clearly in FIG. 2. The pieces which are to be recovered then drop onto a lower conveyor 20, which supplies them to other parts of the system to be described subsequently.

The unusable scrap, in the form of plywood chunks, mitered end trimmings, insulation and the like, continues to be supplied past all of the workers 18; and this unusable material is dumped from the end of the conveyor 12 onto a conveyor 22, mounted on right angles to the conveyor 12, which then supplies the unusable material to a trash bin or a grinder 100.

Any warped or twisted boards which are carried to the end of the conveyor 12 are removed by an operator 24, who cuts the warped or twisted boards into usable lengths with a conventional chop saw or cutoff saw 26. These lengths of board then are placed on the conveyor 20 by the operator 24 to continue on along with the usable wood scrap products placed on the conveyor 20 by the workers 18.

At the left-hand of the conveyor 20, a pair of short cross conveyors 36 and 34 are utilized to receive the material from the conveyor 20 and dump it into storage bins 30 and 32. Another storage bin 28 may be provided with pre-sorted wood to be directly dumped onto the conveyor 20, if desired. All of the pieces of wood which are supplied by the conveyor 20 to the storage bins 30 and 32 constitute pieces which may vary in dimension, in terms of length and width. In addition, the pieces of wood scrap which are supplied to the bins 30 and 32 from the conveyors 34 and 36 may be obtained from varying species at random.

All of these short pieces (and perhaps some full length or long pieces) are supplied to the bins 30 and 32. It should be noted that conventional diverter plates may be employed in conjunction with the left-hand end of the conveyor 20 to determine which of the bins 30 or 32 is to be supplied with the material which is moving on the conveyor 20. Whenever one of the bins 30 or 32 is full, the material then is diverted to another bin, and so on. As shown in FIG. 1B, two additional bins are indicated in dotted lines. The number of bins is dependent upon the flow rate of material and the size of the operation.

The bins 30 and 32 are made in the form of storage bins with what is known as a "walking floor" in them, in the form of a relatively slow moving walking floor to move the material from the upper end as shown in FIG. 1B to the lower end (in reality, the bins are manufactured with horizontal floors), as shown in FIG. 1B. When the material is moved by the walking floor to the discharge end of the bin (the lower end in FIG. 1B), it is dropped onto faster moving walking floors or conveyors 35, as shown in FIG. 1B. The wood which is dumped into the storage bins 30 and 32 may be in a depth of ten feet and it tends to be discharged from the bins in bursts. The faster moving walking floors 35 smooth out the discharge from the slow moving floors in the bins 30 and 32; and these faster moving walking floors 35 are placed between the discharge end of the bins 30 and 32 and another conveyor 37, located at right angles to the walking floors 35.

The conveyor 37 then supplies the 2"×4" and 2"×6" wood scrap products to the left (as shown in the drawings) to work stations managed by operators 40, as shown in FIG. 1A. These operators are located on opposite sides of the conveyor 37 and pick off any wood pieces the ends of which are not square and use chop saws or cutoff saws 38 to square off the ends of pieces passing by the respective operators 40. The squared material (and pieces which already have squared ends) is placed on corresponding conveyors 41, 42, 47 and 49, which move the materials selected by the operators 40 toward a storage bin 54, as shown in FIG. 1A.

Material which is not selected by the operators 40, located adjacent the conveyor 37, is dumped onto a rotary table 16, which returns this material onto a return conveyor 92 past a final inspection operator 94. The operator 94 picks off any remaining material which can be efficiently processed and places this material back on the conveyor 37.

Material which is not selected by the operator 94 is dumped off the conveyor 92 onto a transverse conveyor 96, which in turn dumps its material onto a conveyor 93. The conveyor 93 supplies the rejected or discarded material back to the conveyor 22, from which the rejected material is ultimately discharged into the trash bin 100, as described above.

It should be noted that, in the system layout which is shown in FIG. 1A, the operators 40 located adjacent the conveyors 41, 42, 47 and 49 pick off 2"×4" scrap pieces to supply these pieces, along the conveyors mentioned, into the storage bin 54. 2"×6" scrap pieces are allowed to run to the operators 40 located adjacent a transverse conveyor 130. These 2"×6" pieces are similarly selected by the operators 40 located in this position, and the ends are squared up by chop saws or cutoff saws 38. The pieces then are placed on a conveyor 130, which ultimately supplies them to a conveyor 132 for deposit in a 2"×6" storage bin 134.

As shown in FIG. 1A, optional metal detectors 43 may be located on each of the conveyors 41, 42, 47, 49 and 130 for detecting nails and embedded metal objects which may create a problem in some finger joint machines. If the finger joint machines which are employed in the system are capable of operation irrespective of the presence of metal products in the wood scraps, the metal detectors 43 are not necessary. For finger joint machines, however, where the finger joint blades could be damaged by the presence of metal objects, the metal detectors 43 permit detection of any such metal. Whenever metal is sensed, an air-actuated device of a standard type (not shown) is used to kick the defective wood scrap piece off the respective conveyor onto a transverse conveyor 45, which then dumps the rejected material onto the conveyor 96 for ultimate disposal in the trash bin 100, as described previously.

As shown in FIG. 1A, deflecting saws 46 and 48 also are illustrated as used on two of the conveyor lines 41 and 42. These deflecting saws may be used on all of the lines or, depending upon the nature of the cutoff or chop saws 38, may not be necessary. In any event, if squaring of the ends is required, the saws 46 and 48 effect this step automatically; and the ends which are cut off by these saws are ejected onto the transverse conveyor 98, which in turn carries the rejected material to the conveyor 22 and the trash bin 100, as described previously.

The wood which leaves the deflecting saws 46 and 48, or which passes directly from the optional metal detector stations 43, then passes to an optional moisture sensor 50 located on each of the conveyor lines 41, 42, 47, 49 and 132. For some applications, moisture sensing is not critical; and such sensors would not be employed. Where excess moisture, however, can be a factor and may be encountered, moisture sensors 50 may be employed to reject any wood which has more than a predetermined minimum moisture content in it. Again, standard sensors may be employed; so the details of these sensors are not shown here. Whenever wood with excess moisture is encountered, an air-actuated device is used to kick the offending piece off the respective conveyor in a conventional manner. The rejected pieces then drop onto a conveyor 102, which supplies the excess moisture pieces to a loading conveyor 104 to deposit these pieces in a storage bin 106 for subsequent processing. Preferably, the bin 106 is equipped with a heated floor or an air drying system for reducing the moisture content; so that the material in the bin 106 subsequently may be reprocessed by the system. Again it should be noted that moisture sensors are not required in every system; so that this portion could be eliminated for some systems operating in accordance with the preferred embodiment of the invention.

A next step in the processing is to supply all of the 2"×4" wood pieces on the conveyors 41, 42, 47 and 49 and the 2"×6" pieces on the conveyor 132 through width sensors 52. The width sensors are used to sense any board pieces which have shrunk below a marketable width (3–3/8" for 2×4's and 5–3/8" for 2×6's). Consequently, any boards which are below or under this width are ejected by an air-actuated device to kick these undersized pieces off the respective conveyors onto a transverse conveyor 110, which is illustrated as being capable of being operated in either direction. Operation in a direction to move material to the right in of FIGS. 1A and 1B causes material on the conveyor 110 to be supplied to a cross conveyor 112 which dumps the undersized pieces into a storage bin 114 for storage. When the conveyor 110 is run in the opposite direction, a storage bin 115 is used to hold the undersized pieces for subsequent processing or disposal.

Wood which has passed all of the foregoing tests is carried past inspectors 116 who pick off the highest structural quality wood, or pick off selected species, and place this wood on a transverse conveyor 118, which also may operate in either direction. When the conveyor 118 is operating in one direction, the selected pieces are dumped into a storage bin 120. If several species are selected or sorted, additional bins 120 for each species may be provided. When the conveyor 118 is operated in the opposite direction, these pieces are dumped into a storage bin 121 for subsequent processing by the system.

The remaining wood which is on the conveyors 41, 42, 47 and 49 is supplied to a walking floor storage bin 54 of the same type as described previously in conjunction with the storage bins 30 and 32. The bin 54 operates as a buffer and supplies a steady supply of material from a slow moving walking floor in the bottom of the bin 54 to a faster moving walking floor 56 which evens out the discharge of the bin 54, as described previously. The walking floor 56 dumps the precut, squared 2"×41" pieces of varying lengths onto a conveyor 57, which then transfers the material to a conveyor 58. The conveyor 58 has a diverter on it (not shown) of a standard type for diverting some of the material on the conveyor 58 into a temporary storage bin 60 and allowing others of the material on the conveyor 58 to be supplied to a second storage bin 62. The storage bins 60 and 62 each are affiliated with a different one of two finger joint machines 72 and 80, respectively.

Material in the storage bins 60 and 62 then is removed from these bins in the same manner described previously for the removal of materials from the storage bins 30, 32 and 54. Walking floors moving at a relatively slow rate transfer the material from the storage bins 60 and 62 onto respective faster moving walking floor mechanisms 64 and 66. These, in turn, deposit the useful 2"×4" recovered scrap products onto conveyors 68 and 76, respectively, from which the material then is supplied over conveyors 70 and 78, respectively, to the finger joint machines 78 and 80.

When 2"×6" sizes are to be run, the walking floors of the storage bin 60 and the walking floor 64 are turned off and the walking floors in the storage bin 134 for the 2"×6" lumber is engaged. As described previously, the slow moving walking floor at the bottom of the bin 134 dumps the 2"×6" material onto the faster moving walking floor 136, which then supplies this material to the conveyor 68 for utilization by the finger joint machine 72 in the manner described previously.

A similar operation for utilization of the select products in the storage bin 121 may be effected. In this situation, the slow walking floors in the storage bins 60 and 164, along with the fast moving walking floors 64 and 136, are turned off; and the fast moving walking floor 122 in conjunction with the slow moving walking floor in the bottom of the storage bin 121 is placed in operation. This causes removal of the "select" material, which is deposited on the conveyor 68 for utilization in the finger joint machine 72. A similar operation is effected for "under-size" material in the storage bin 115, if such material is to be utilized in some manner. A fast moving walking floor 124 at the output of the storage bin 115 deposits such under size material onto the conveyor 68 for subsequent processing.

By means of the use of the storage bins with walking floors and the continuously moving conveyors described above in conjunction with the system and method, it is possible to supply a continuous stream of 2"×4" (or 2"×6" when 2"×6" materials are to be transferred) to the finger joint machines 72 and 80. Thus, the finger joint machines operate on a continuous basis throughout any given shift. Standard finger joint machines 72 and 80 of high quality for handling 2"×4" and 2"×6" variable length pieces are available; and the system providing these machines with a continuous, steady flow of material permits an optimum utilization of these machines. The material which is produced by the finger joint machines then is removed from the machines in desired lengths, in a standard manner, at 74 and 72 for storage and transportation from the recycling facility. The conveyor system which is described and shown minimizes labor costs. By operating the finger joint machines 72 and 80 non-stop from the moment they are turned on until they are turned of at the end of a shift has an obvious advantage of maximizing production. More importantly, however, continuous operation of the finger joint machines 72 and 80 minimizes the problem of glue drying in the dispensing heads. Whenever glue sets up in the dispensing heads of a finger joint machine, it not only creates down time while the heads are cleaned, but also can cause dry joints and result in defective product.

It can be seen from the foregoing, the system and method which has been described permits the continuous operation of finger joint machines from a periodic or sporadic input, which is dumped by dump trucks onto the large pad 10 at the input side of the system. Nails and foreign material may be removed if desired from the product as described. By employing operators at the positions described, the use of cutoff saws by the operators permits removal of mitered, checkered or broken ends, permits removal of knots and other defects in the wood, and permits the cutting of bowed and twisted wood into lengths where the distortion is negligible; so that this wood is fully recovered. The result of the system is a nearly ten fold increase in the value of the recovered scrap material from that of the low-end uses described previously. The recovered material is construction grade framing lumber in 2"×4" and 2"×6" sizes.

It should be noted that the system and method which is described above has the ability to perform the recovery and recycling of framing lumber of 2"×4" and 2"×6" dimensions on pieces of wood ranging from a few inches to several feet in length. When the steps of the invention which have been described above are followed, a high quality framing lumber output is produced, which in many cases is actually of better quality than standard framing lumber now being produced. The reason for this is that finger jointed lumber is much less prone to warp and twist than is standard framing lumber made from a single piece of wood.

The foregoing description of the preferred embodiment of the invention should be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A method for recovering and recycling construction waste lumber wood scrap products including the steps of:

delivering construction waste lumber wood scrap products to a recovery input site;

removing said wood scrap products from said recovery input site;

discarding unusable wood scrap products removed from said recovery site to obtain recovered wood scrap products;

squaring the ends and cutting out defects from said recovered wood scrap products;

separating sizes of said recovered wood scrap products by width into at least first and second separated sizes;

detecting and removing under-width wood scrap products from said recovered wood scrap products of said first and second separated sizes to provide usable wood scrap products of said first and second sizes; and supplying said usable wood scrap products of one of said first and second sizes sequentially to a finger joint machine for fabricating lengths of finished recycled lumber.

2. The method according to claim 1 wherein said wood scrap products are removed from said recovery input site at a predetermined rate.

3. The method according to claim 2 wherein said step of supplying said usable wood scrap products to said finger joint machine is one of continuously supplying said usable wood scrap products and further including a step of temporarily storing said usable wood scrap products prior to the step of continuously supplying said usable wood scrap products to said finger joint machine.

4. The method according to claim 3 further including a step of cutting warped and twisted boards in said construction waste lumber wood scrap products into usable lengths following the step of removing said waste wood products from said recovery input site.

5. The method according to claim 4 further including the steps of detecting metal in said recovered wood scrap products and removing wood scrap products in which metal is detected.

6. The method according to claim 5 further including a step of sensing moisture in said recovered wood scrap products and removing any recovered wood scrap products having a moisture content greater than a predetermined amount.

7. The method according to claim 1 wherein said step of supplying said usable wood scrap products to said finger joint machine is one of continuously supplying said usable wood scrap products and further including a step of temporarily storing said usable wood scrap products prior to the step of continuously supplying said usable wood scrap products to said finger joint machine.

8. The method according to claim 7 further including a step of cutting warped and twisted boards in said construction waste lumber wood scrap products into usable lengths following the step of removing said waste wood products from said recovery input site.

9. The method according to claim 1 further including the steps of detecting metal in said recovered wood scrap products and removing wood scrap products in which metal is detected.

10. The method according to claim 1 further including a step of sensing moisture in said recovered wood scrap products and removing any recovered wood scrap products having a moisture content greater than a predetermined amount.

11. The method according to claim 1 further including a step of cutting warped and twisted boards in said construction waste lumber wood scrap products into usable lengths following the step of removing said waste wood products from said recovery input site.

12. A system for recovering and recycling construction waste lumber wood scrap products which have been delivered to a recovery input site including in combination:

means for removing said wood scrap products from said recovery input site;

means for discarding unusable wood scrap products removed from said recovery input site to obtain recovered wood scrap products;

means for squaring the ends and cutting out defects from said recovered wood scrap products;

means for removing recovered wood scrap products having a width which is less than a predetermined amount from said recovered wood scrap products to provide usable wood scrap products; and means for supplying said usable wood scrap products to a finger joint machine for fabricating lengths of finished recycled lumber.

13. The system of claim 12 further including means for detecting metal in said recovered wood scrap products and for removing wood scrap products in which metal is detected.

14. The system according to claim 12 further including means for sensing the moisture content in said recovered wood scrap products and for removing wood scrap products having a moisture content greater than a predetermined amount.

15. The system according to claim 12 wherein said means for removing wood scrap products from said recovery input site removes such wood scrap products at a predetermined rate.

16. The system according to claim 15 further including means for temporarily storing said usable wood scrap products coupled with said means for supplying said usable wood scrap products to said finger joint machine for effecting a continuous supply of said usable wood scrap products to said finger joint machine.

17. The system according to claim 12 further including means for temporarily storing said usable wood scrap products coupled with said means for supplying said usable wood scrap products to said finger joint machine for effecting a continuous supply of said usable wood scrap products to said finger joint machine.

* * * * *